(12) United States Patent
Lin

(10) Patent No.: US 6,716,779 B2
(45) Date of Patent: Apr. 6, 2004

(54) SUBSTRATE GLASS FOR OPTICAL INTERFERENCE FILTERS WITH MINIMAL WAVE LENGTH SHIFT

(75) Inventor: Jacob W. Lin, Richardson, TX (US)

(73) Assignees: OptoElectronics International, Inc., Hsin-Chu (TW); Yeong C. Lin, Fountain Valley, CA (US)

(*) Notice: Subject to any disclaimer, the term of this patent is extended or adjusted under 35 U.S.C. 154(b) by 150 days.

(21) Appl. No.: 09/929,688

(22) Filed: Aug. 14, 2001

(65) Prior Publication Data
US 2003/0050173 A1 Mar. 13, 2003

(51) Int. Cl.⁷ .................. C03C 3/085; C03C 3/087; C03C 3/095
(52) U.S. Cl. .................. 501/64; 501/69; 501/70; 501/73
(58) Field of Search .................. 501/69, 70, 72, 501/79, 64, 73

(56) References Cited

U.S. PATENT DOCUMENTS

| | | | |
|---|---|---|---|
| 5,780,373 A | * 7/1998 | Yanagisawa et al. | 501/72 |
| 5,895,768 A | * 4/1999 | Speit | 501/57 |
| 5,997,977 A | * 12/1999 | Zou et al. | 428/64.1 |
| 6,251,812 B1 | * 6/2001 | Koyama et al. | 501/69 |
| 6,268,304 B1 | * 7/2001 | Maeda et al. | 501/65 |
| 6,306,786 B1 | * 10/2001 | Koyama et al. | 501/69 |
| 6,333,286 B1 | * 12/2001 | Kurachi et al. | 501/69 |
| 6,340,647 B1 | * 1/2002 | Koyama et al. | 501/69 |
| 6,399,527 B1 | * 6/2002 | Kishimoto et al. | 501/69 |
| 6,410,466 B1 | * 6/2002 | Goto et al. | 501/5 |

\* cited by examiner

*Primary Examiner*—David Sample
(74) *Attorney, Agent, or Firm*—William L. Chapin

(57) ABSTRACT

A silicate based composition for optical glass used as a substrate for thin film optical interference filters having a stable transmission band center wavelength and bandwidth has a relatively high coefficient of thermal expansion, high Young's modulus and high optical transmittance in the near infrared (NIR) wavelength range of about 950 nm to about 1600 nm. The coefficient of thermal expansion of the glass composition is adjustable to particular values to result in minimal wavelength shift in filters made by depositing thin films of particular dielectric materials onto a substrate made of the glass, the composition being varied from a preferred baseline composition consisting of about 43.2% $SiO_2$, 7% $Al_2O_3$, 12.7% CaO, 7.3% SrO, 7.8% $Li_2O$, 13.2% $Na_2O$, 8.0% $K_2O$, 0.7% ZrO, and 0.1% $Sb_2O_3$, the baseline composition having a coefficient of thermal expansion of about $112 \times 10^{-7}/°$ C. over the temperature range of $-30°$ C. to $+70°$ C., a Young's modulus E of 88.3 Gpa, and an optical transmittance of 90.9% at 1550 nm for an 8 mm thick sample plate.

7 Claims, No Drawings

SUBSTRATE GLASS FOR OPTICAL INTERFERENCE FILTERS WITH MINIMAL WAVE LENGTH SHIFT

BACKGROUND OF THE INVENTION

A. Field of the Invention

The present invention relates to glasses suitable for being shaped into small, flat windows used as substrates onto which thin film coatings of a suitable material are applied to form optical interference filters. More particularly, the invention relates to a glass composition in which relative proportions of components thereof may be varied to adjust the thermal expansion coefficient of the glass to relatively high values which are tailored to suit characteristics of particular thin film coatings, enabling fabrication of optical interference filters having transmission bands which shift minimally in wavelength in response to varying temperatures and other environmental stresses.

B. Description of Background Art

Optical interference filters fabricated by applying onto a thin, flat transparent glass substrate one or more coatings of dielectric or conductive films each having a thickness which is a multiple of one-quarter wavelength of a light of a particular wavelength are well known and widely used. Optical thin film interference filters are of various types, including low pass or high pass filters which transmit light having wavelengths longer or shorter than a particular cut-off wavelength, band pass filters which transmit only light having wavelengths within a particular band of wavelengths, and notch filters which transmit light over a range of wavelengths comprising a pass band while reflecting or absorbing light in a smaller range of wavelengths centered about a notch wavelength contained within the pass band. One common example of a thin film optical interference filter is the optical anti-reflection coating on the lenses of binoculars, which forms therewith a relatively wide band pass filter for light within the visible spectrum, minimizing reflections from the surface of objective lenses of light received from an object viewed and maximizing transmission of light through the eyepieces to the eyes of a viewer.

Performance requirements for band pass filters used in certain optical communications applications, such as Dense Wavelength Division Multiplexing (DWDM) are more demanding than those imposed on other applications for optical interference filters, as will now be explained.

In Dense Wavelength Division Multiplexing (DWDM) light energy in discrete wavelength bands is modulated with radio frequency signals containing audio, video or digital information including telephone conversations, television transmissions and digital computer data signals. In a typical DWDM system, an optical signal generated by a laser and having a center wavelength in the near infrared portion of the electromagnetic spectrum, e.g., 1.5 microns, (1500 nanometers) is subdivided into a plurality of wavelength bands which comprise separate optical carrier channels. Each optical carrier channel may have a bandwidth of about 0.2 nanometers, and be separated from one another by about 8 nanometers. The amplitude or phase of each of the optical carrier channel signals is modulated by a plurality of radio frequency sub-carrier channel signals, e.g., having a bandwidth of about 25 GHz and a channel separation of about 100 GHz. Each RF channel is in turn modulated at a lower frequency with information such as digitized telephone conversation signals, television signals or other digital data.

In a simplified example, a DWDM system may employ separate optical carrier channel signals each having a band width of 0.2 nanometer and center wavelengths of 1500, 1499.2, 1498.4, 1500.8, and 1501.6, nanometers, respectively. The plurality of optical carrier channel signals is optically combined or "multiplexed" onto a single optical beam, which may then be transmitted on a single optical fiber. Optical multiplexing may be performed using a resonant cavity filter, such as the one depicted in FIG. 3 of U.S. Pat. No. 5,953,134, the entire specification of which is incorporated herein by reference. The resonant cavity filter described therein employs a plurality of individual interference filters, each one being highly transmissive to light in a particular wavelength band, and highly reflective to all other wavelengths of light.

At the receiving end of an optical fiber or other transmission media through which combined or multiplexed optical signals are transmitted, a resonant optical cavity provided with a separate interference filter for each optical channel may be used to divide or "de-multiplex" the combined signal into separate optical beams which are arranged to impinge on a plurality of separate photo-detectors, one for each optical channel, thus allowing signal information contained on each optical carrier channel to be directed to appropriate destinations for the information signals on each channel, where the information may be recovered by demodulating the optical carrier signal.

Because of the very narrow bandwidth and close center wavelength spacing required of interference filters used for DWDM applications as described above, both the center wavelength and bandwidth must remain precisely fixed in spite of variations in ambient temperature, humidity, and other environmental conditions encountered by DWDM systems. Otherwise, data transmitted over adjacent optical channels could intermix, be reduced substantially in signal-to-noise ratio, or be lost entirely. Thus, the glass which is used for substrates onto which dielectric coatings are applied to form interference filters for use in DWDM applications must have properties which differ from those of existing glass compositions, for the following reasons.

Conventional glasses may be broadly categorized as "soft" or "hard." Soft glasses typically have a linear coefficient of thermal expansion ($\alpha$ or "CTE") of greater than $60 \times 10^{-7}$, while hard glasses usually have a CTE of less than $60 \times 10^{-7}$. The softer glasses generally have a lower Young's modulus and are generally more subject to surface degradations by environmental conditions such as high temperatures, humidity and/or corrosive atmospheres. On the other hand, it has been determined that glass used as a substrate for receiving dielectric coatings to form highly wavelength-stable interference filters of the type required for DWDM applications should have a relatively high Young's modulus, to provide required dimensional stability, but must also have a thermal coefficient of expansion which is substantially larger than that typical of hard glasses. Moreover, it has been found that to maintain the center wavelength and bandwidth of optical interference filters stable enough for use in DWDM applications, the thermal expansion coefficient of the glass filter substrate must be rather precisely tailored to suit properties of the particular dielectric coatings applied to the substrate. Typical dielectric coating materials include oxides of titanium, tantalum, niobium, silicon and aluminum, and other substances. It is believed that better wavelength stability is obtained using glass substrates with higher coefficients of expansion, because the high CTE's tend to produce compressive stresses in metal oxide coatings deposited on the glass, when the glass cools down to ambient temperature after being heated to a temperature typically exceeding 200° C. during the coating process, which is typically done in a low pressure chamber.

In apparent recognition of the desirability of providing a glass with special properties for use as substrates for DWDM interference filters, NAOYURI, in Patent Publication Number EP 1081512 disclosed a glass for a light filter stated to be capable of preventing variations of refractive index in a band pass filter, to have a coefficient of thermal expansion within a range from $90 \times 10^{-7}/°$ C. to $120 \times 10^{-7}/°$ C. within a temperature range of $-20°$ C. to $+70°$ C., and, preferably a Young's modulus of 75GPa or over, a Vickers hardness of 550 or over, and light transmittance for plate thickness of 10 mm of 90% or over within a wavelength range of 950 nm to 1600 nm.

The present invention was conceived of to provide an improved glass composition which is particularly well suited for use as a substrate for optical interference filters, of the type used in dense wave division multiplexing (DWDM)

OBJECTS OF THE INVENTION

An object of the present invention is to provide a glass composition which has a relatively high thermal coefficient of expansion.

Another object of the invention is to provide a glass composition which has a relatively high thermal coefficient of expansion, and a relatively high Young's modulus.

Another object of the invention is to provide a glass composition which has a relatively high coefficient of thermal expansion, a relatively high Young's modulus, and a relatively high light transmittance.

Another object of the invention is to provide a glass composition which is suitable for use as a substrate to receive thin film coatings which form in combination with the substrate an interference filter having a transmission band which is stably positioned at a selected wavelength region.

Another object of the invention is to provide a glass composition which has a relatively high thermal coefficient of expansion which may be varied in a predetermined manner as a function of variations in percentage composition of components of the glass.

Another object of the invention is to provide a glass composition which is suitable for use as a substrate for optical interference filters having a transmission band which is stably centered on a particular wavelength.

Another object of the invention is to provide a glass composition which is suitable for use as a substrate for optical interference filters of the type used in Dense Wave Division Multiplexing (DWDM), the composition having a thermal coefficient of expansion adjustable by adjusting proportions of components of the composition to values in the approximate range of 105 to $120 \times 10^{-7}/°$ C. over a temperature range of approximately $-30°$ C. to $+70°$ C., a Young's modulus of 85 Gpa or greater, an optical transmittance of 91% or greater over a wavelength range from about 1300 nm to about 1600 nm, for a substrate having a thickness of 8 mm or less, and environmental resistance to surface damage when exposed to high temperature, high humidity environments for extended periods of time.

Various other objects and advantages of the present invention, and its most novel features, will become apparent to those skilled in the art by perusing the accompanying specification and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a new silicate-based optical glass composition which has physical properties that make the glass particularly well suited to use as a substrate on which thin film coatings may be applied to form optical interference filters having a narrow wavelength transmission band which is precisely centered on a selected wavelength, in spite of variations of ambient temperature. Stable narrow band optical interference transmission filters of this type are required for certain optical communication applications such as Dense Wave Division Multiplexing (DWDM). According to one aspect of the present invention, a silicate glass composition is provided which has a relatively large coefficient of thermal expansion, found necessary to maintain wavelength stability in optical interference filters fabricated by applying thin dielectric coatings onto a glass substrate. According to the invention, relative proportions of components of the novel glass composition may be varied to vary the resultant coefficient of thermal expansion (CTE) over an approximate range of 91 to $120 \times 10^{-7}/°$ C. and over a preferred range of approximately 105 to 120 $10^{-7}/°$ C. According to another aspect of the invention, a silicate glass composition for optical interference filter substrates is provided which has a high CTE, in the approximate range of 91 to 121 $10^{-7}/°$ C., and also has a high rigidity, i.e., has a Young's modulus of over 85 Gpa. A high Young's modulus is desirable for glass substrates used for optical interference filters of the type used in DWDM, since such filters are made using very small, thin plates having dimensions of the order of 2 mm×2 mm×2mm or smaller, and are therefore subject to deformation sufficient to cause shifts in the optical properties of the filter in response to small mechanical stresses, if the Young's modulus of the glass is not sufficiently high.

According to another aspect of the present invention, a novel silicate glass composition is provided which has a high CTE which may be varied in a predictable manner by changing relative proportions of components of the composition, a high Young's modulus and a relatively high optical transmittance, e.g., a transmittance of 90% or greater for a sample thickness of 8 mm over the approximate near infrared (NIR) wavelength range of 1300 nm to 1600 nm, while also being resistance to surface damage when exposed to high temperatures and high humidity conditions for prolonged time periods.

The high thermal expansion coefficient range stated above as being a requirement for glass used as a substrate for DWDM optical interference filters is higher than that of most current optical glasses. Typically, such higher thermal coefficients of expansion are achieved only in softer, weaker glasses. But softer, weaker glasses have a lower Young's modulus, and are therefore insufficiently rigid for DWDM applications, and also are subject to surface degradation in high humidity, high temperature environments. Accordingly, a delicate manipulation of glass composition is required to create a glass which has the properties specified above.

It has been discovered by the present inventor that requirements of glass properties for DWDM filter substrates set forth above can be fulfilled with glasses having the following composition (in mole %):

40–62% $SiO_2$

2–20% ($Al_2O_3$, $B_2O_3$, $La_2O_3$)

8–36% alkaline oxides

0–40% alkaline earth oxides

0–20% of any non-color generating heavier metal oxides.

A preferred glass composition found by the present inventor to be capable of satisfying the aforementioned requirements has the following composition, in mole %:

43.3% $SiO_2$ 7.0% $Al_2O_3$ 12.7% CaO 7.3% SrO 7.8% $Li_2O$ 13.2% $Na_2O$ 8.0% $K_2O$ 0.7% $ZrO_2$ 0.1% $Sb_2O_3$.

The preferred composition glass had a coefficient of thermal expansion (CTE) of $112 \times 10^{-7}/C$ over the temperature range $-30°$ C. to $+70°$ C., a Young's modulus E of 88.3 Gpa, and an optical transmittance of 90.9% at 1550 nm for an 8 mm thick sample.

DETAILED DESCRIPTION OF THE INVENTION

As a result of extensive investigations on the relationship between types and proportions of various glass components and their respective influence on the glass properties, the present inventor has discovered a novel glass composition, described in greater detail hereinafter, which satisfies the aforementioned property requirements.

In the compositional investigations, each experimental melt was made with 200 to 250 grams of glass. The thoroughly mixed batch material was melted in a platinum crucible for about 90 minutes followed by a 5–10 minute mechanical stirring and then a refining period of about 20 minutes. Melting temperature ranged from 1350° C. to 1460° C. depending on the chemical composition and batch materials.

Variation of each component of the aforesaid composition affects certain glass characteristics. The effect and range of proportions of each component have been investigated and are explained in the following paragraphs.

Tests performed indicated that the glass thermal expansion depends on the type and concentration of each component in the glass. Higher concentration of a matrix component, $SiO_2$, causes difficulty in the glass achieving a target range of its coefficient of thermal expansion. Lower concentrations of $SiO_2$ makes it easier to reach target values of the thermal expansion coefficient requirement, yet the glass tends to become less stable and poor in environmental resistance when the concentration is too low. These effects can be demonstrated by the examples in the following tables.

In a first series of tests, the results of which are summarized in Table 1, the concentration of $SiO_2$ was varied from 37.4% to 65.0%. As indicated by the test data of Table 1, if the concentration of $SiO_2$ is too low, e.g., 37.4%, slight devitrification of the glass occurs, resulting in decreased transmissibility. As is also shown in Table 1, increasing the concentration of $SiO_2$ from 40% to 65% decreases the coefficient of thermal expansion (CTE) from $126 \times 10^{-7}$ to $91 \times 10^{-7}/°$ C. Based upon the results of test series 1, it was concluded a preferred concentration range of $SiO_2$ is between about 40% and about 58%.

TABLE 1

| Composition in Mole % | | | | | | CTE, | |
|---|---|---|---|---|---|---|---|
| $SiO_2$ | $R_2O_3$ | RO | $R_2O$ | $ZrO_2$ | Refiners | $10^{-7}/°$ C. | Glass Quality |
| 37.4 | 6.9 | 20.0 | 35.0 | 0.7 | 0.1 | NA | Slightly devitrified |
| 40.0 | 3.6 | 22.6 | 33.6 | 0.0 | 0.1 | 125 | Clear Glass |
| 50.0 | 3.0 | 18.9 | 28.0 | 0.0 | 0.1 | 112 | Clear Glass |
| 65.0 | 2.1 | 13.2 | 19.6 | 0.0 | 0.1 | 91 | Clear Glass |

$R_2O_3$ includes $AL_2O_3$ and/or $B_2O_3$.
RO includes MgO, CaO, SrO, and/or BaO.
$R_2O$ includes $Li_2O$, $Na_2O$, and $K_2O$.
Refiners are $As_2O_3$ and $Sb_2O_3$.
CTE is measured in the range of $-30°$ C. to $+70°$ C. Its units are $10^{-7}/°$ C.

In a second series of tests, the results of which are summarized in Tables 2A and 2B, it was determined that components of alkaline metal oxides in glass according to the present invention have a major effect on the CTE. Thus, as shown in Table 2A, CTE values of 106, 113 and 120 were obtained for total alkaline metal oxide concentrations of 24%, 28% and 32% respectively. Similarly, as shown in Table 2B, CTE values of 104, 111, and 121 were obtained for total alkaline metal oxide concentrations of 23.1%, 27% and 30.9%, respectively. The present inventor has also found that distribution, i.e., relative proportions of different alkaline oxides, also affects the properties of glass according to the present invention. Of the three most important such oxides, $Li_2O$, $Na_2O$ and $K_2O$, $K_2O$ appears to have the greatest effect on increasing the coefficient of thermal expansion (CTE). In general, it was found that the effect on the thermal expansion coefficient follows the order of $K_2O > NA_2O > Li_2O$. On the other hand, the effect of alkaline oxides on Young's modulus follows the order $Li_2O > Na_2O > K_2O$.

Based upon tests summarized in Tables 2A and 2B, it has been determined that a preferred total alkali content in glasses according to the present invention lies in the range between about 15 mole % and about 30 mole %. The exact total alkaline oxide molar concentration, and distribution percentage between the various alkaline oxides, depend on the glass user's required specifications; especially the CTE and Young's modulus.

TABLE 2A

| Composition in mole % | | | | | | | | | | |
|---|---|---|---|---|---|---|---|---|---|---|
| $SiO_2$ | $AL_2O_3$ | $La_2O_3$ | CaO | SrO | BaO | $Li_2O$ | $Na_2O$ | $K_2O$ | Refiners | CTE |
| 54.9 | 1.6 | 1.6 | 11.8 | 3.0 | 3.0 | 8.1 | 12.0 | 3.9 | 0.2 | 106 |
| 52.0 | 1.5 | 1.5 | 11.2 | 2.8 | 2.8 | 9.5 | 14.0 | 4.5 | 0.2 | 113 |
| 49.1 | 1.4 | 1.4 | 10.6 | 2.6 | 2.6 | 10.9 | 16.0 | 5.1 | 0.1 | 120 |

TABLE 2B

| | | | | Composition in mole % | | | | | | | |
|---|---|---|---|---|---|---|---|---|---|---|---|
| $SiO_2$ | $Al_2O_3$ | $La_2O_3$ | CaO | SrO | BaO | $Li_2O$ | $Na_2O$ | $K_2O$ | Refiners | CTE |
| 58.0 | | 3.3 | | 7.2 | 8.3 | 11.1 | 7.7 | 4.3 | 0.2 | 104 |
| 55.0 | | 3.1 | | 6.8 | 7.9 | 13.0 | 9.0 | 5.0 | 0.2 | 111 |
| 52.0 | | 3.0 | | 6.4 | 7.5 | 14.9 | 10.3 | 5.7 | 0.2 | 121 |

The refiners are $As_2O_3$ and $Sb_2O_3$.
CTE was evaluated at temperature range of −30~+70° C. Its units are $10^{-7}/°$ C.

Test series number 3 performed in the course of development of glasses according to the present invention revealed that percentage concentrations of alkaline earth oxides in the glass composition have effects on glass properties similar to, but not as pronounced as, those of alkaline oxides. Thus, as shown in Table 3, a total alkaline earth oxide concentration of 10.8% comprised of 5.0% SrO and 5.8% BaO resulted in a CTE of 109, a total alkaline earth oxide concentration of 14.7% comprised of 6.8% SrO and 7.9% BaO resulted in a CTE of 111, and a total alkaline earth oxide concentration of 18.8% comprised of 8.7% SrO and 10.1% BaO resulted in a CTE of 113.

resistance, and may increase Young's modulus, its presence in glasses according to the present invention is permissible. Preferably, the concentration of $B_2O_3$ will be less than 10%.

TABLE 3

| | | | | Composition in mole % | | | | | | |
|---|---|---|---|---|---|---|---|---|---|---|
| $SiO_2$ | $Al_2O_3$ | $La_2O_3$ | CaO | SrO | BaO | $Li_2O$ | $Na_2O$ | $K_2O$ | Refiners | CTE |
| 57.5 | 0 | 3.3 | 0 | 5.0 | 5.8 | 13.6 | 9.4 | 5.2 | 0.2 | 109 |
| 55.0 | 0 | 3.1 | 0 | 6.8 | 7.9 | 13.0 | 9.0 | 5.0 | 0.2 | 111 |
| 52.4 | 0 | 3.0 | 0 | 8.7 | 10.1 | 12.4 | 8.6 | 4.8 | 0.2 | 113 |

The refiners are $As_2O_3$ and $Sb_2O_3$.
CTE was evaluated at temperature range of −30~+70° C. Its units are $10^{-7}/°$ C.

Test series numbers 4 and 5 were performed to determine the effects of trivalent components $Al_2O_3$, $B_2O_3$ and $La_2O_3$ on glasses according to the present invention. As shown in Tables 4 and 5, increasing the concentration of $B_2O_3$ from 0 to 2.9% had the effect of lowering CTE. Since the reduction of CTE due to the inclusion of $B_2O_3$ is not very great, and since $B_2O_3$ is known to improve glass stability and chemical

TABLE 4

| | | | | Composition in mole % | | | | | | | |
|---|---|---|---|---|---|---|---|---|---|---|---|
| $SiO_2$ | $B_2O_3$ | $Al_2O_3$ | $La_2O_3$ | MgO | CaO | BaO | ZnO | $Na_2O$ | $K_2O$ | Refiners | CTE |
| 56.3 | 2.9 | 1.0 | 4.4 | 2.9 | 8.4 | 2.9 | 2.6 | 15.6 | 2.8 | 0.2 | 97 |
| 58.0 | 0.0 | 1.0 | 4.5 | 3.0 | 8.6 | 3.0 | 2.7 | 16.1 | 2.9 | 0.2 | 104 |

The refiners are $As_2O_3$ and $Sb_2O_3$.
CTE was evaluated at temperature range of 30~100° C. Its units are $10^{-7}/°$ C.

TABLE 5

| | | | | Composition in mole % | | | | | | | |
|---|---|---|---|---|---|---|---|---|---|---|---|
| $SiO_2$ | $B_2O_3$ | $Al_2O_3$ | $La_2O_3$ | CaO | BaO | ZnO | $Na_2O$ | $K_2O$ | Refiners | CTE |
| 56.2 | 2.9 | 1.0 | 7.8 | 8.3 | 2.9 | 2.6 | 15.4 | 2.8 | 0.2 | 100 |
| 57.9 | 0.0 | 1.0 | 8.0 | 8.5 | 3.0 | 2.7 | 15.9 | 2.8 | 0.2 | 103 |

The refiners are $As_2O_3$ and $Sb_2O_3$.
CTE was evaluated at temperature range of 30~100° C. Its units are $10^{-7}/°$ C.

In test series number 6, it was found that aluminum oxide in glasses according to the present invention tend to reduce CTE and Young's modulus, as indicated in Table 6. However, presence of this trivalent oxide in glasses according to the present invention is believed to improve glass stability and environmental resistance, and therefore may be included in the formulation.

TABLE 6

| | | | | Composition in mole % | | | | | | | |
|---|---|---|---|---|---|---|---|---|---|---|---|
| $SiO_2$ | $AL_2O_3$ | MgO | CaO | SrO | BaO | $Li_2O$ | $Na_2O$ | $K_2O$ | Refiners | E | CTE |
| 50.8 | 1.5 | 3.0 | 8.4 | 4.9 | 2.9 | 9.7 | 14.2 | 4.6 | 0.2 | 88.2 | 120 |
| 50.0 | 3.0 | 3.0 | 8.3 | 4.8 | 2.8 | 9.5 | 14.0 | 4.5 | 0.2 | 86.2 | 113 |
| 48.7 | 5.5 | 2.9 | 8.0 | 4.7 | 2.7 | 9.3 | 13.6 | 4.4 | 0.2 | 84.9 | 106 |
| 47.7 | 7.5 | 2.9 | 7.9 | 4.6 | 2.7 | 9.1 | 13.4 | 4.3 | 0.2 | NA | 104 |

The refiners are $As_2O_3$ and $Sb_2O_3$.
CTE was evaluated at temperature range of $-30 \sim +70°$ C. Its units are $10^{-7}/°$ C.
The units for Young's modulus, E, are GPa.

Test series number 7 was performed to ascertain the effects of aluminum oxide and lanthanum oxide on the CTE and Young's modulus of glasses according to the present invention. As indicated in Table 7A, increasing the percentage of La2O3 from 0%, 1.6%, and 3.0% while simultaneously deceasing the percentage of $Al_2O_3$ over the range 3.0%, 1.4% and 0% caused CTE to increase to 113, 115, 116, respectively. Also, as shown in Table 7B, reducing the percentage of $LA_2O_3$ from 3.0% to 0%, while increasing the concentration of $AL_2O_3$ from 0.0% to 3.0%, while maintaining the concentration of the other components constant caused a decrease in CTE of only $116 \times 10^{-7}/°$ C. to $113 \times 10^{-7}/°$ C., and a decrease in Young's modulus E of only 90.0 Gpa to 86.2 Gpa.

ment is quite small. We did some experimental melts with small amounts of $P_2O_5$ and found a very little change in Young's modulus and thermal expansion. The magnitude of changes are very close to our technical measurement error limits. Therefore, it might not be of any proven effect. For the present invention, the limit for this component is less than 5%, its preferred concentration is less than 2%.

For an experienced class chemist, it is possible to add other components into the preferred compositions of this invention with little variation of the glass properties. Such components include, but are not limited to: the oxides of tantalum, yttrium, ytterbium, zinc, zirconium, titanium, niobium, tungsten, cerium, tin and hafnium. The limit for each of these component is believed to be approximately 0 to 8 mole %.

TABLE 7A

| | | | | | Composition in mole % | | | | | | | |
|---|---|---|---|---|---|---|---|---|---|---|---|---|
| $SiO_2$ | $AL_2O_3$ | $La_2O_3$ | MgO | CaO | SrO | BaO | $Li_2O$ | $Na_2O$ | $K_2O$ | Refiners | E | CTE |
| 50.0 | 3.0 | 0.0 | 0 | 11.2 | 4.8 | 2.8 | 9.5 | 14.0 | 4.5 | 0.2 | 86.0 | 113 |
| 50.0 | 1.4 | 1.6 | 0 | 11.2 | 4.8 | 2.8 | 9.5 | 14.0 | 4.5 | 0.2 | 87.2 | 115 |
| 50.0 | 0.0 | 3.0 | 0 | 11.2 | 4.8 | 2.8 | 9.5 | 14.0 | 4.5 | 0.2 | 88.6 | 116 |

TABLE 7B

| | | | | | Composition in mole % | | | | | | | |
|---|---|---|---|---|---|---|---|---|---|---|---|---|
| $SiO_2$ | $AL_2O_3$ | $La_2O_3$ | MgO | CaO | SrO | BaO | $Li_2O$ | $Na_2O$ | $K_2O$ | Refiners | E | CTE |
| 50.0 | 3.0 | 0.0 | 3 | 8.3 | 4.8 | 2.8 | 9.5 | 14.0 | 4.5 | 0.2 | 86.2 | 113 |
| 50.0 | 0.0 | 3.0 | 3 | 8.3 | 4.8 | 2.8 | 9.5 | 14.0 | 4.5 | 0.2 | 90.0 | 116 |

The refiners are $As_2O_3$ and $Sb_2O_3$.
CTE was evaluated at temperature range of $-30 \sim +70°$ C. Its units are $10^{-7}/°$ C.
Young's modulus, E, is in the units of GPa.

Thus, the advantage of lanthanum oxide over aluminum oxide in increasing CTE and Young's modulus is not very significant and the latter material is cheaper, aluminum oxide may be used in place of lanthanum oxide in glasses according to the present invention. For the present invention, the preferred concentration for aluminum oxide is between about 0 to 10 mole % and that of lanthanum oxide is between about 0 to 9 mole %.

It is usually possible to include a small amount of $P_2O_5$ in silicate glass without any major ill effects. However, the tolerance for such inclusion without causing serious detri-

What is claimed is:
1. Silicate glass for use as a substrate for optical interference filters comprising in mole percentages the following ingredients:
   a. $SiO_2$: approximately 43.2%,
   b. $Al_2O_3$: approximately 7.0%,
   c. CaO: approximately 12.7%,
   d. SrO: approximately 7.3%,
   e. $Li_2O$: approximately 7.8%,
   f. $Na_2O$: approximately 13.2%,
   g. $K_2O$: approximately 8.0%,
   h. ZnO: approximately 0.7%,
   i. $Sb_2O_3$, $As_2O_3$ approximately 0.1 total.

2. The glass as defined in claim 1 further defined as having a coefficient of thermal expansion lying in the approximate range between about $91 \times 10^{-7}/°$ C. and about $120 \times 10^{-7}/°$ C.

3. The glass as defined in claim 1 further defined as having a Young's modulus of greater than 80 Gpa.

4. The glass as defined in claim 1 further defined as having an optical transmission at 1550 nm of greater than about 90% for a plate thickness of about 8 mm.

5. Silicate glass for use as a substrate for optical interference filters comprising in mole percentages the following ingredients:
   a. $SiO_2$: approximately 52% to about 58%,
   b. $La_2O_3$: Approximately 3.0% to about 3.3%,
   c. Alkaline metal oxides: approximately 25% to about 28%,
   d. Alkaline earth oxides: approximately 10% to about 19%,
   e. Non-color generating heavier metal oxides: approximately 0% to about 20%.

6. Silicate glass for use as a substrate for optical interference filters comprising in mole percentages the following ingredients:
   a. $SiO_2$: approximately 47% to about 51%,
   b. ($Al_2O_3$): approximately 1.0% to about 8.0%,
   c. Alkaline metal oxides: approximately 26% to about 29%,
   d. Alkaline earth oxides: approximately 18% to about 19%,
   e. Non-color generating heavier metal oxides: approximately 0% to about 20%.

7. Silicate glass for use as a substrate for optical interference filters comprising in mole percentages the following ingredients:
   a. $SiO_2$: approximately 50%,
   b. ($Al_2O_3$, $La_2O_3$): approximately 3.0%,
   c. Alkaline metal oxides: approximately 28%,
   d. Alkaline earth oxides: approximately 19%,
   e. Non-color generating heavier metal oxides: approximately 0% to about 20%.

* * * * *